Feb. 21, 1967

A. ALFORD 3,305,775

TRANSFER CHARACTERISTIC MEASURING EMPLOYING
SUBSTANTIALLY CONSTANT IMPEDANCE CONSTANT
AMPLITUDE SOURCE FOR DRIVING AND
TERMINATING INPUT BRANCH

Filed Dec. 5, 1962

INVENTOR.
ANDREW ALFORD
BY
*Ezekiel Wolf, Wolf & Greenfield*
ATTORNEYS

INVENTOR.
ANDREW ALFORD

United States Patent Office 3,305,775
Patented Feb. 21, 1967

3,305,775
TRANSFER CHARACTERISTIC MEASURING EMPLOYING SUBSTANTIALLY CONSTANT IMPEDANCE CONSTANT AMPLITUDE SOURCE FOR DRIVING AND TERMINATING INPUT BRANCH
Andrew Alford, Winchester, Mass.
(299 Atlantic Ave., Boston, Mass. 02148)
Filed Dec. 5, 1962, Ser. No. 242,503
8 Claims. (Cl. 324—57)

The present invention relates in general to transfer characteristic measuring and more particularly concerns apparatus for measuring the standing wave ratio (SWR) and/or transfer characteristic of a device as a continuous function of frequency, time or other variable parameter rapidly and with great accuracy. SWR or transfer characteristics may be quickly investigated even when several independent variables exist, since changes are immediately observed. A permanent record of the measurement is readily available upon a strip chart recorder. And continuous frequency coverage over an exceptionally wide range of frequencies may be attained by using relatively few interchangeable components.

It is an important object of the invention to provide apparatus for rapidly measuring the transfer characteristic of a device as a continuous function of time or a variable parameter.

It is another object of the invention to rapidly measure the SWR of a device as a continuous function of frequency, time or other variable parameter.

It is another object of the invention to achieve the preceding object while accurately measuring small mismatches.

It is another object of the invention to achieve the preceding objects while preserving a permanent record of the measurements.

It is still another object of the invention to achieve the preceding objects over an exceptionally wide range of frequencies with relatively few components.

It is still another object of the invention to achieve the preceding objects with relatively compact rugged apparatus relatively low in cost while still making measurements with relatively high accuracy.

According to the invention, an input branch delivers energy to a device under test. An output branch receives that portion of the energy delivered to the input branch that is transmitted by the device under test. Means are provided for applying periodic bursts of high frequency energy to the input branch. Each burst consists of a train of sinusoidal cycles of substantially the same amplitude whose period is much shorter than the duration of each burst and the time interval between consecutive bursts. Means responsive to the signal on the input branch develop a control signal. Means responsive to the control signal maintain the amplitude of the bursts substantially constant independently of the sinusoidal cycle. Amplifying means selectively transmit a sinusoidal signal having the same period as the periodic bursts in response to the signal on the output branch to provide an output signal representative of the transfer characteristic of the device under test at the frequency corresponding to the contemporary burst sinusoidal cycle.

In a preferred form of the invention, the device under test comprises a network having a parallel branch, a series branch and a pair of side branches. This network is characterized by the property that when the branches are terminated in their respective characteristic impedances, energy applied to the series branch does not reach the parallel branch and energy applied to the parallel branch does not reach the series branch. If one of the side branches is terminated in a standard impedance corresponding to the characteristic impedance of that side branch and the other side branch terminated in an unknown impedance whose properties are to be measured, making one of the parallel and series branches the input branch and the other of these branches the output branch results in the system output signal being characteristic of the SWR of the unknown impedance referred to the standard impedance.

Numerous other features, objects and advantages of the invention will become apparent from the following specification when read in connection with the accompanying drawing in which.

Figure 1:
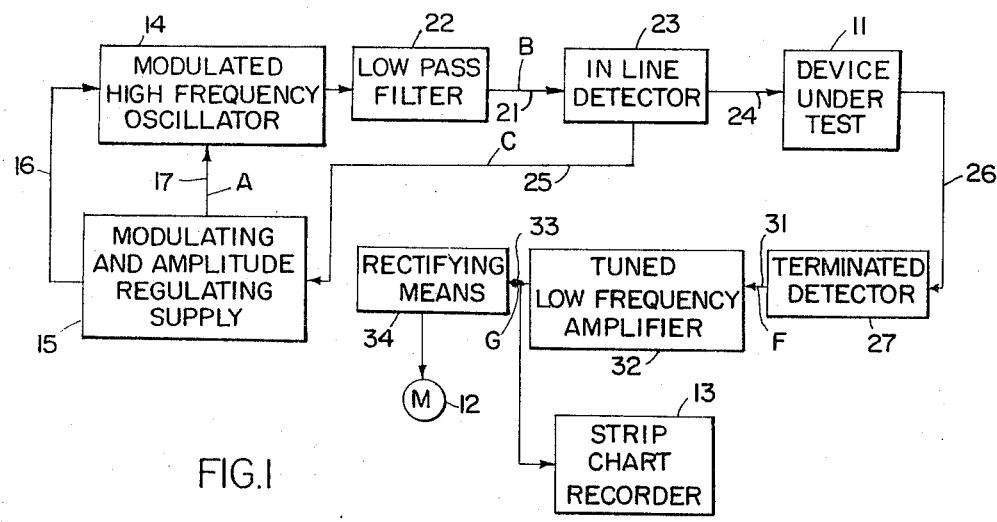
FIG. 1 is a block diagram generally illustrating the logical arrangement of a system according to the invention.

With reference now to the drawing and more particularly FIG. 1 thereof, there is shown a block diagram generally illustrating the logical arrangement of a system according to the invention in which the transfer characteristic of the device under test 11 may be indicated on the meter 12 and permanently recorded on the strip chart recorder 13.

Figure 2:
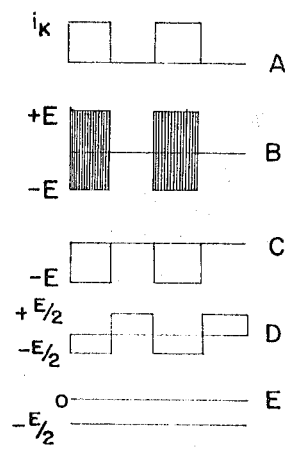
FIG. 2 is a graphical representation on a common time scale of representative signal waveforms present on the correspondingly designated lines in other portions of the drawing.

In describing the system shown in FIG. 1, reference will be made to pertinent signal waveforms plotted to a common time scale in FIG. 2.

The modulating and amplitude regulating supply 15 delivers suitable high D.C. and filament potentials over lines 16 to modulated high frequency oscillator 14. This supply also provides current pulses on line 17 shown in FIG. 2A to the cathode of the oscillator tube in modulated high frequency oscillator 14 to produce corresponding bursts on line 21 shown in FIG. 2B after higher harmonics are attenuated by low pass filter 22. Inline detector 23 transmits this signal to the input branch 24 of the device under test 11.

The detected output of inline detector 23 on line 25 shown in FIG. 2C is also transmitted to the modulating and amplitude regulating supply for developing a control signal which maintains the peak oscillator cathode current $i_k$ (FIG. 2A) constant substantially independent of the high frequency emitted by modulated oscillator 14. A suitable circuit for accomplishing this result is described in greater detail below.

Output branch 26 carries that portion of the energy transmitted by the device under test 11 to the terminated detector 27 which provides the square modulation envelope shown in FIG. 2F on line 31 representative of the transmission characteristic of the device under test 11 at the contemporary frequency emitted by modulated high frequency oscillator 14. Tuned low frequency amplifier 32 selectively transmits and amplifies the fundamental component of this modulation envelope (FIG. 2G) on line 33 for permanent recording by strip chart recorder 13 and to rectifying means 34 for conversion into a proportional D.C. signal indicated by meter 12.

Figure 3:
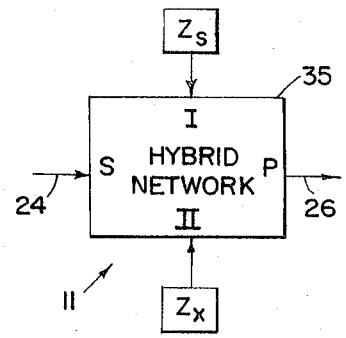
FIG. 3 shows a hybrid circuit intercoupling standard and unknown impedances for making SWR measurements.

Referring to FIG. 3, there is shown a block diagram of a device under test 11 comprising a hybrid network, such as that disclosed in any of Patents Nos. 2,976,497, 2,950,449, or 2,769,146, in which the input branch 24 is the series branch of hybrid network 35 while the parallel branch is output branch 26. Side branch I is terminated in a standard impedance, $Z_s$, and side branch II is terminated in an unknown impedance $Z_x$. Under these conditions, the signal indicated by meter 12 and recorded on strip chart recorder 13 may be characteristic of the SWR of the impedance $Z_x$ referred to the impedance $Z_s$ as a function of frequency provided by modulated high frequency oscillator 14. Meter 12 may be calibrated to indicate directly in SWR.

Figure 4:
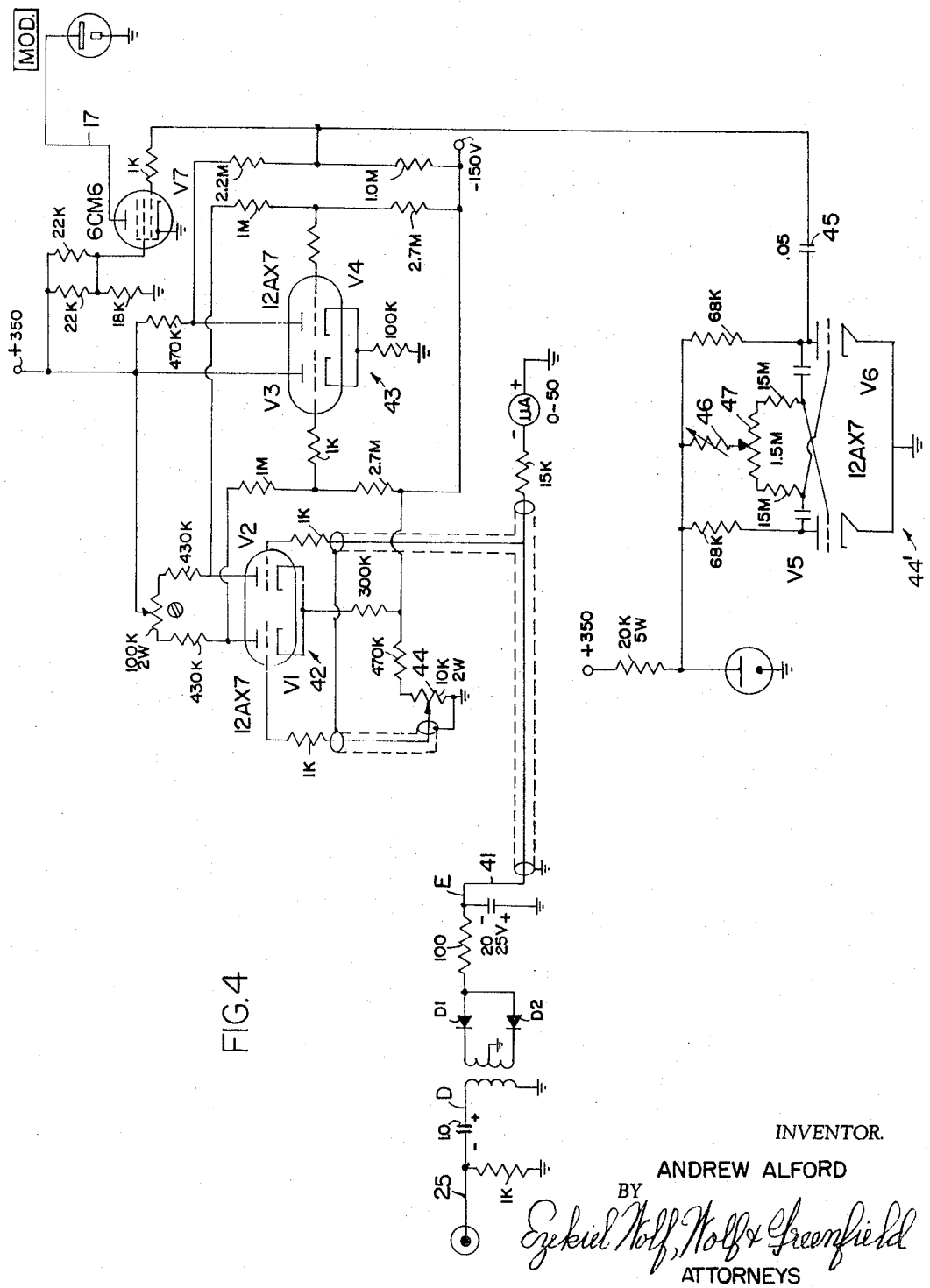
FIG. 4 is a schematic circuit diagram of a preferred form of the modulating and amplitude regulating supply shown in FIG. 1.

Referring to FIG. 4, there is shown a schematic circuit diagram of an exemplary embodiment of the circuit for receiving the output of the inline detector 23 on line 25 providing the current pulses on line 17 to the modulated high frequency oscillator 14. Typical parameter values are indicated in the drawing.

Diodes D1 and D2 and associated circuitry function to convert the modulation envelope of square waveform on line 25 (FIG. 2D) into a negative potential on line 41 (FIG. 2E) representative of the waveform on line 25.

The differential amplifier 42 comprising tubes V1 and V2 and associated circuit components functions to provide a balanced output signal between the plates of tubes V1 and V2 representative of the difference in potential on line 41 and the potential developed on the arm of potentiometer 44. Potentiometer 44 permits manual adjustment of the amplitude of the signal emitted by modulated high frequency oscillator 14.

The differential amplifier 43 comprising tubes V3 and V4 and associated circuit components amplifies the D.-C. potential difference between the plates of tubes V1 and V2 to develop a control potential on the plate of tube V4. This control potential is direct-coupled to the grid of tube V7 to set the D.-C. bias on that tube in accordance with the amplitude of the detected signal waveform on line 25 so as to maintain that signal and the signal applied on input branch 24 on the device under test substantially constant.

A free running multivibrator comprising tubes V5 and V6 functions as the source of the modulating signal to provide a signal of rectangular waveform and substantially constant amplitude through coupling capacitor 45 whose frequency is controlled by adjusting variable resistance 46 and whose duty cycle is controlled by adjusting the arm of potentiometer 47. The duty cycle is preferably adjusted to be 50%. The frequency is typically adjusted to a value of one kilocycle for use in a system having a continuous frequency coverage from 100 kc. to 1,700 megacycles using interchangeable R-F bridges and detectors. The choice of parameters should be such that the duration of both portions of the modulating signal waveform period is long compared to the period of a high frequency signal emitted by the modulated high frequency oscillator. Thus, a 1 kc. square wave half cycle period of 500 microseconds is long compared to the 10 microsecond period of the 100 kc. signal.

This modulating signal from multivibrator 44' is superimposed upon the D.-C. potential direct-coupled from the plate of tube V4 to the grid of tube V7. On the negative half cycle of this grid signal tube V7 does not conduct while on the positive half cycle tube V7 conducts and establishes the cathode current of the oscillator tube (not shown) at a level determined by the D.-C. component of potential on the grid of tube V7 when conducting.

In a representative embodiment of the invention, the inline detector 23 comprises an Alford Type 1126 diad matching T. This diad T consists of a main 50 ohm branch which divides into two side branches. In each of the side branches there is a 50 ohm resistor connected in series with the inner conductor. The output of low pass filter 22 is applied to the main branch; that is, to the junction of the two 50 ohm resistors. Line 24 is connected to one of the side branches. The other side branch is coupled to line 25 by a diode. The latter junction of the two 50 ohm resistors comprises means defining a regulated junction, and the latter diode comprises nonlinear detecting means. A 50 ohm resistor is also connected between that other side branch and ground to terminate that side branch in substantially 50 ohms. The latter resistor in said other side branch comprises attenuating means for coupling the latter nonlinear detecting means to the regulated junction. If the device under test 11 presents an impedance of 50 ohms to inline detector 23, a condition which normally exists when that device is an Alford "Hybridge" network, then the inline detector terminates the device under test in 50 ohms. This termination occurs because the amplitude levelling system prevents the potential on the main branch from changing, despite changes in current. The impedance at this point is therefore substantially zero, and the impedance presented to line 24 by inline detector 23 to this zero impedance point is substantially the 50 ohm resistance in the diad T side branch.

A suitable terminated detector 27 comprises Alford Type 2191 detector-mixer. This component comprises a coaxial line intercoupling two coaxial terminal pairs. The diode couples the inner conductor of this line to the inner terminal of a third coaxial terminal pair where the detected output signal is available for delivery on line 31. One of the two coaxial terminal pairs receives energy from line 26 and the other is terminated in an Alford Type 1108C 50 ohm instrument load. This arrangement then terminates the output line 26 of device 11 under test in 50 ohms, typically the characteristic impedance of the device 11 when it is an Alford "Hybridge" network.

In a representative embodiment of the invention embodying the Alford Type 28 SWR and Transfer Characteristic Meter, it is preferred that the oscillator R-F output power be less than about 1 watt to insure that the detecting crystals are not damaged. It is also preferred that the oscillator supply at least 20 milliwatts because the meter scales for this commercial embodiment are calibrated at this input power level. Reduced accuracy would result at lower power levels. General Radio Company Oscillator types 1211B, 1215B, 1204B and 1218B not only meet these power requirements, but are also capable of being modulated and regulated by the power supply comprising the Alford commercial embodiment of this invention having provision for receiving oscillator cathode current on line 17.

This commercial embodiment of the invention is adapted for use with Alford type 1233B, 1234, 1235, 1323, 1324 and 1325 "Hybridge" R-F bridges and the strip chart recorder 13 may comprise an Alford type 2267 strip chart recorder and Alford type 2268 amplifier.

For SWR measurements the Alford type 28 meter has a rated accuracy of ±.015 ±5% of the reflection coefficient over a temperature range 60° F. to 95° F. For transfer characteristic measurements it has a rated accuracy of ±0.5 db ±0.2 db per range switch step over temperature range 60° F. to 95° F. Typical meter scales include SWR full scales of infinity, 2.0, 1.2 and 1.07 and transfer characteristic full scales of 0, 10, 20 and 30 db.

There has been described a novel system capable of accurately indicating the frequency transfer characteristic of a device as a function of a predetermined parameter rapidly, accurately and over a wide frequency range with relatively inexpensive and relatively compact apparatus relatively easy to use. It is evident that those skilled in the art may now make numerous modifications of and departures from the specific embodiment described herein without departing from the inventive concepts. Consequently, the invention is to be construed as limited solely by the spirit and scope of the appended claims.

What is claimed is:

1. Transfer characteristic measuring apparatus comprising,
   an input branch for delivering energy to a device under test,
   inline detector means including means for terminating said input branch substantially in its characteristic impedance,
   said inline detector means including means defining a regulated junction maintained at substantially constant R-F potential when R-F signal is present on said regulated junction, first side branch means having an impedance of substantially said characteristic impedance for coupling said regulated junction to said input branch and thereby terminating said input branch substantially in its characteristic impedance, nonlinear detecting means for providing a low frequency signal of amplitude representative of the R–F potential present on said regulated junction, and means including second side branch means for coupling said regulated junction to said nonlinear detecting means, the latter means for coupling including attenuating means, an output branch for receiving that portion of the energy delivered to said input branch that is transmitted by the device under test to said output branch, a source of periodic bursts of radio frequency energy, each burst consisting of a train of sinusoidal cycles of substantially the same amplitude whose period is much shorter than the duration of each burst and the time interval between consecutive bursts, means for applying said periodic bursts to said input branch through said inline detector means, means responsive to said low frequency signal provided by said nonlinear detecting means for developing a control signal, means responsive to said control signal for maintaining the amplitude of said bursts on said regulated junction substantially constant independently of the sinusoidal cycle period.

and amplifying means for selectively transmitting a sinusoidal signal having the same period as said periodic bursts responsive to the signal on said output branch for providing an output signal representative of the transfer characteristic of a device under test at the frequency corresponding to the contemporary burst sinusoidal cycle period.

2. Transfer characteristic measuring apparatus in accordance with claim 1 and further comprising a hybrid network having a series branch, a parallel branch and a pair of hybrid network side branches and characterized by the property that when said hybrid network side branches are terminated in substantially equal impedances energy applied to one of said series and parallel branches is prevented from reaching the other of said series and parallel branches, means for coupling said one branch to said input branch, and means for coupling said other branch to said output branch.

3. Transfer characteristic measuring apparatus in accordance with claim 2 and further comprising a standard impedance coupled to one of said hybrid network side branches.

4. Transfer characteristic measuring apparatus in accordance with claim 3 and further comprising an unknown impedance coupled to the other of said hybrid network side branches.

5. Transfer characteristic measuring apparatus in accordance with claim 1 wherein said inline detector includes means for providing said low frequency signal with rectangular waveform corresponding to the modulation envelope of said periodic bursts of radio frequency energy, means for converting said signal of rectangular waveform into a first D.-C. signal related to the amplitude of said waveform, a source of a reference fixed D.-C. signal, means for comparing said reference fixed D.-C. signal with said first D.-C. signal to provide a difference signal representative of the difference therebetween, a source of a modulating signal of substantially constant amplitude having a rectangular waveform corresponding to that of the modulation envelope of said periodic bursts, means for combining said modulating signal with said difference signal to provide a biased modulating signal having an average value determined by said difference signal, an amplifying device having at least a control electrode and an output electrode, and means for coupling said biased modulating signal to said control electrode so that said amplifying device provides rectangular current pulses from said output electrode as said control signal.

6. Transfer characteristic measuring apparatus in accordance with claim 5 wherein said amplifying device is an electron tube providing a current from its output electrode substantially independent of the potential thereon but dependent upon the potential on its control electrode, and means for coupling said current pulses from said output electrode to said source of periodic bursts.

7. Transfer characteristic measuring apparatus in accordance with claim 6 wherein said biased modulating signal renders said electron tube alternately conductive and nonconductive to produce a train of said current pulses on said output electrode of controlled amplitude.

8. Apparatus comprising, a source of periodic bursts of radio frequency energy, each burst consisting of a train of sinusoidal cycles of substantially the same amplitude whose period is much shorter than the duration of each burst and the time interval between consecutive bursts, means for providing a signal of rectangular waveform corresponding to the modulation envelope of said periodic bursts of radio frequency energy, means for converting said signal of rectangular waveform into a first D.-C. signal related to the amplitude of said waveform, a source of a reference fixed D.-C. signal, means for comparing said reference fixed D.-C. signal with said first D.-C. signal to provide a difference signal representative of the difference therebetween, a source of a modulating signal of substantially constant amplitude having a rectangular waveform corresponding to that of the modulation envelope of said periodic bursts, means for combining said modulating signal with said difference signal to provide a biased modulating signal having an average value determined by said difference signal, an amplifying device having at least a control electrode and an output electrode, means for coupling said biased modulating signal to said control electrode so that said amplifying device provides rectangular current pulses of controlled amplitude, and means for coupling said current pulses from said output electrode to said source of periodic bursts to maintain the amplitude of said bursts substantially constant, said means for providing a signal of rectangular waveform corresponding to the modulation envelope of said periodic bursts of radio frequency energy comprising, inline detector means including means defining a regulated junction maintained at substantially constant R-F potential when R-F signal is present on said regulated junction, an output terminal, first side branch means having a predetermined impedance for coupling said regulated junction to said output terminal, main branch means for coupling said source of periodic bursts to said regulated junction, nonlinear detecting means for providing said signal of rectangular waveform correseponding to the modulation envelope of said periodic bursts of radio frequency energy which signal is representative of the R-F potential present on said regulated junction, and second side branch means having associated there-with attenuating means coupling said regulated junction to said nonlinear detecting means, whereby a load connected to said output terminal may be energized by a voltage source having an effective stubstantially constant internal impedance corresponding to said predetermined impedance while providing periodic bursts of said radio frequency energy at substantially constant amplitude.

References Cited by the Examiner
UNITED STATES PATENTS

| | | | |
|---|---|---|---|
| 2,733,340 | 1/1956 | Garner et al. | 331—183 |
| 2,956,243 | 10/1960 | Weinschel | 331—183 |
| 2,983,866 | 5/1961 | Alford et al. | 324—58 |

OTHER REFERENCES

Byers, W. F.: Type 1263-A Amplitude Regulating Power Supply in General Radio Experimenter, vol. 29, No. 11, April 1955, pp. 6 through 9.

Gioidano, Anthony: "Microwave Measurements," in Radio-Electronic Engineering, April 1955, pp. 11–14, 58 and 59.

WALTER L. CARLSON, *Primary Examiner.*

RUDOLPH V. ROLINEC, *Examiner.*

G. L. LETT, E. E. KUBASIEWICZ, *Assistant Examiners.*